(12) United States Patent
Arpino

(10) Patent No.: US 6,204,579 B1
(45) Date of Patent: Mar. 20, 2001

(54) ELECTRONIC SWITCHING ELECTRIC MOTOR

(75) Inventor: Fabio Arpino, Milan (IT)

(73) Assignee: Bitron S.p.A., Nichelino (IT)

( * ) Notice: Subject to any disclaimer, the term of this patent is extended or adjusted under 35 U.S.C. 154(b) by 0 days.

(21) Appl. No.: 09/301,833

(22) Filed: Apr. 29, 1999

(30) Foreign Application Priority Data

May 7, 1998 (IT) .............................................. TO980089 U

(51) Int. Cl.[7] ...................................................... H02K 1/04
(52) U.S. Cl. .................................. 310/43; 310/89; 29/596
(58) Field of Search ................................ 310/43, 62, 89, 310/40 MM, 156, 68 R; 29/596

(56) References Cited

U.S. PATENT DOCUMENTS

| | | | |
|---|---|---|---|
| 3,771,319 | * | 11/1973 | Nichols et al. .......................... 62/233 |
| 4,471,246 | * | 9/1984 | Paillet ...................................... 310/42 |
| 4,644,233 | * | 2/1987 | Suzuki .................................... 318/254 |
| 4,743,173 | * | 5/1988 | Wrobel .................................... 417/554 |
| 4,758,751 | * | 7/1988 | Hosoya et al. ........................... 310/41 |
| 5,109,173 | * | 4/1992 | Someya et al. ......................... 310/261 |
| 5,135,363 | * | 8/1992 | Harmsen et al. ...................... 417/354 |
| 5,304,884 | * | 4/1994 | Katajima et al. ...................... 310/198 |
| 5,313,125 | * | 5/1994 | Bosman et al. ...................... 310/49 R |
| 5,604,654 | * | 2/1997 | Wille et al. .............................. 361/23 |
| 5,845,390 | * | 12/1998 | Cheng et al. ............................ 29/596 |
| 5,982,064 | * | 11/1999 | Umeda et al. ........................... 310/90 |

* cited by examiner

Primary Examiner—Joseph Waks
(74) Attorney, Agent, or Firm—Merchant & Gould P.C.

(57) ABSTRACT

An electronic switching electric motor having a rotor and a stator having a number of stator teeth is characterized in that an assembly element of stator teeth is made of plastic and is co-molded with the stator teeth. The electric motor has two support seats for the rotor, where at least one of the support seats is present in the assembly element.

11 Claims, 3 Drawing Sheets

Tav. I

ELECTRONIC SWITCHING ELECTRIC MOTOR

The present invention refers to an electronic switching electric motor.

In particular, the present invention refers to, without in any way losing any of its generality, an electronic switching electric motor which may be used to advantage for activating ventilation devices to be installed in refrigerators, and comprises a stator, and a rotor which is rotatably coupled to the stator itself, and an electronic device for supplying and controlling the electric motor itself.

Normally, in electronic switching electric motors of well-known types, the above-mentioned stator comprises a determined number of stator teeth, a determined number of windings realised around the teeth themselves, and an assembly element of the teeth themselves realised in insulating plastic material to insulate the windings one form the other and from the stator teeth themselves.

With regard to well-known types of electronic switching electric motors currently in use for activating ventilation devices, electric motors of the kind mentioned above present a high level of operating efficiency and a low level of consumption, and, taking into consideration that the demand for electric motors for activating ventilation devices is in the order of hundreds of thousands of units per year, the use of electronic switching electric motors for these kind of applications means that considerable savings in financial terms can be made.

It should be stated, however, that the electronic switching electric motors currently in use still have a relatively complex structure, to the extent that the achievement of the above-mentioned savings in financial terms is somewhat compromised.

The aim of the present invention is to realise an electronic switching electric motor which can be used for the activation of ventilation devices in refrigerators, which is economically viable and simple to produce.

According to the present invention, an electronic switching electric motor is to be realised comprising a rotor, and a stator defined by a number of stator teeth and by an assembly element of the stator teeth themselves; the electric motor being characterised by the fact that the said assembly element comprises two support seats for the rotor, at least a first seat of the said two seats being realised with the assembly element itself.

The invention will now be described with reference to the attached drawings, which illustrate a non-limiting embodiment of the invention, in which.

Figure 1:
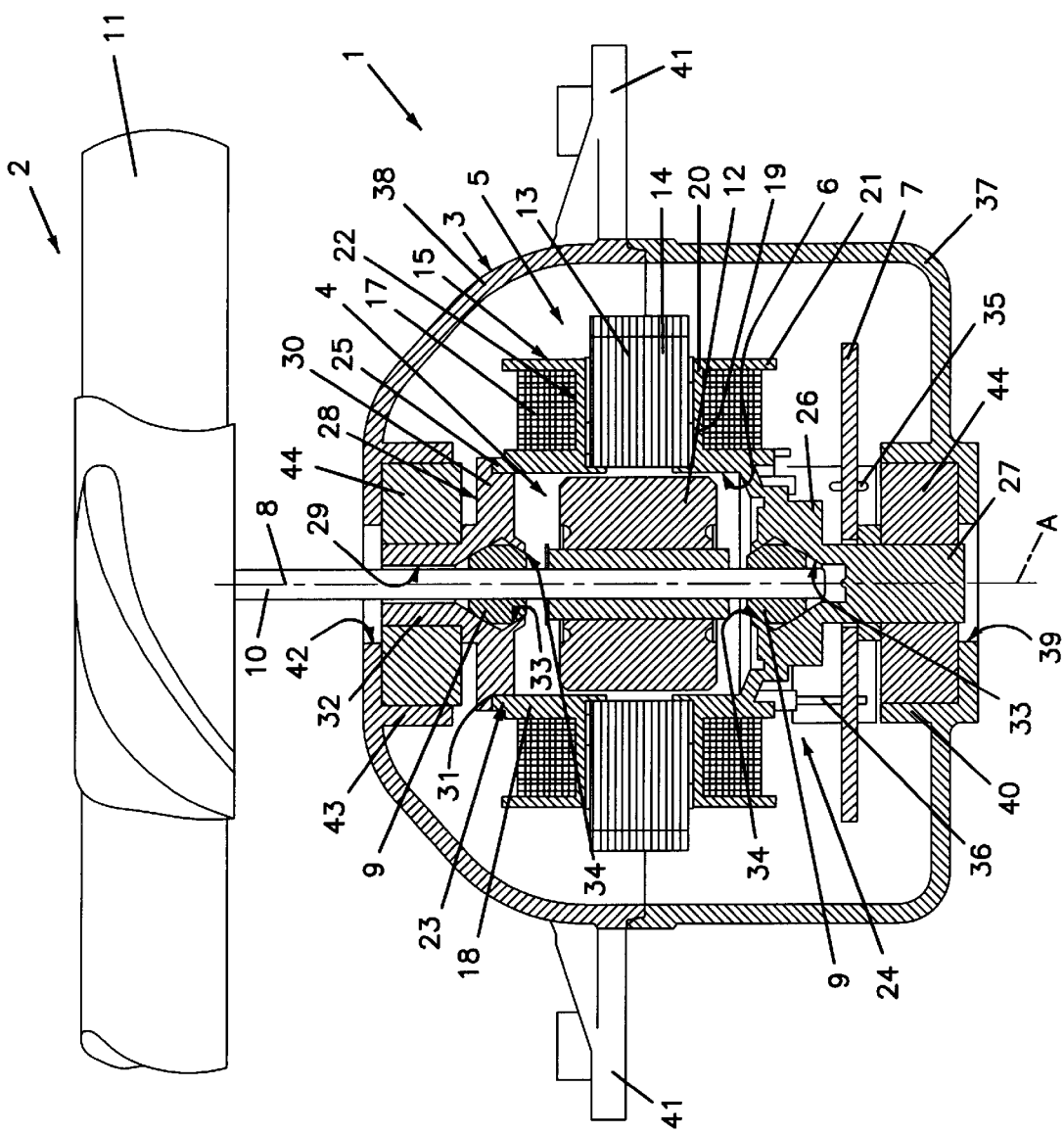
FIG. 1 illustrates a first preferred embodiment of an electric motor, according to the present invention, in section.
Figure 2:
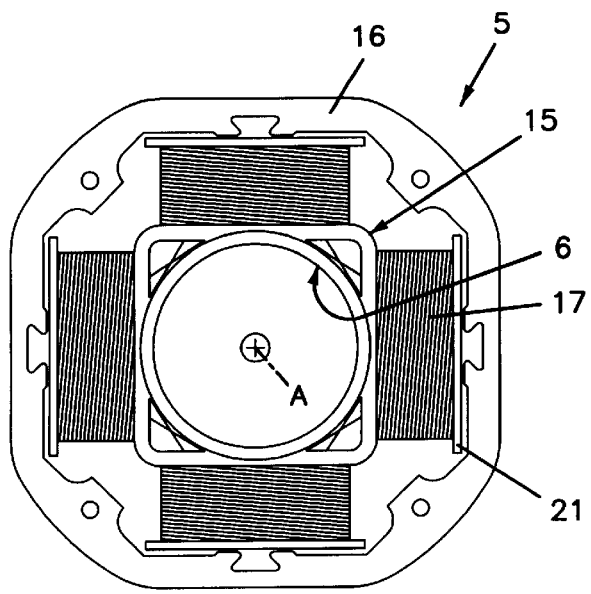
FIG. 2 illustrates a transverse section, with some parts removed for reasons of clarity, of the motor shown in FIG. 1.

With reference to FIGS. 1 and 2, the number 1 indicates, in its entirety, an electronic switching electric motor suitable for activating a ventilation device 2 which can be installed in a refrigerator (not illustrated).

The motor 1 is a brush-less motor with four-pole permanent magnets, supplied by mains voltage (50÷60 Hz; 110÷230 V), and it comprises an external casing 3 for protection and support, a rotor 4, a stator 5 supported by the casing 3 itself and presenting an internal opening 6 for housing the rotor 4, and an electronic device 7 for supplying and controlling the motor 1 itself lined with a protective layer of insulating resin.

The rotor 4 comprises a shaft 8, which is rotatably supported by the stator 5 by means of the interposition of two bushings 9, and presents a free extremity 10 which extends to the exterior of the opening 6 and to the exterior of the casing 3 to support an axial fan 11 of the device 2. The rotor 4 also comprises a permanent magnet 12, which is placed inside the opening 6, and mounted on the shaft 8 in an intermediate position between the bushings 9 and is angularly integral to the shaft 8 itself.

The stator 5 comprises four stator teeth 13, which are uniformly distributed around an A axis of rotation of the rotor 4, and are each defined by a number of shaped metallic laminations 14 laterally arranged side by side one to the other. The stator 5 also comprises an assembly element 15 of the teeth 13, and an external ring 16, which rigidly joins the teeth 13 to each other, but this is mounted on the teeth 13 only after the realisation of the stator windings 17. The element 15 is a monolithic element realised in plastic material co-molded with the teeth 13, and comprising a main tubular body 18 coaxial to the A axis, and for each tooth 13, a secondary tubular body 19, which is transversally arranged to the A axis itself, and is provided with, in correspondence to a radially external extremity 20, a flange 21. The flange 21 defines, with the relative body 19 and with the body 18, a reel 22 provided with an annular seat 22a, which houses a relative winding 17, and is accessible form the outside due to the realisation of the winding 17 itself, for example by means of a so-called flyer, until the ring 16 is mounted onto the teeth 13.

The element 15 also comprises two longitudinal extremity portions 23 and 24 arranged on either side of the body 18, and of which the portion 23 is facing towards the fan 11, and this is a tubular portion provided with an annular border 25 transverse to the A axis, while the portion 24 is substantially T-shaped, and comprises a disc 26 arranged transversally to the A axis and joined to the body 18, and a cylinder 27 which extends along the A axis from the disc 26 opposite the opening 6 with regard to the disc 26 itself.

The element 15 also finally comprises a cover 28, which is coupled to the border 25 to close the section 6, and presents a through hole 29 co-axial to the A axis, and rotatably engaged by the shaft 8. In particular, the cover 28 comprises a circular plate 30 presenting an external annular border 30 mounted with interference inside the border 25; and a tubular element 32 which extends along the A axis from the plate 30 opposite the section 6 with regard to the plate 30 itself.

The disc 26 and the plate 30 are both provided with two support seats 33, each of which houses a relative bushing 9, and presents, on the part turned towards the opening 6, an opening 34 which permits the relative bushing 9 to be snap mounted. The disc 26 is also provided, on the part turned towards the exterior of the opening 6, with a number of fixing elements 35 for fixing the device 7 to the disc 26 itself, and with a determined number of anchor pins 36 for the winding wires which co-operate with the element 35 for fixing the device 7 itself.

The casing 3 comprises two semi-shells 37 and 38 jointed and assembled to each other, of which the shell 37 presents a hole 39 co-axial to the A axis and an annular border 40 which extends around the hole 39 itself, while the shell 38 is provided with two external support flanges 42 suitable for permitting the casing 3 to be mounted on a rigid support (not illustrated) of the above-mentioned refrigerator, and presenting a hole 42 which is rotatable engaged by the extremity 10 of the shaft 8, and an annular border 43 which extends around the hole 42 itself.

The casing 3 also comprises two elastic support elements 44, which are defined by respective rings preferably realised in elastomer, are interposed between the border 40 and the cylinder 27 and between the border 43 and the tubular element 32, and are suitable for elastically suspending the motor 1 and insulating it form the vibrations caused by the pulsating of the torque and the unbalancing of the rotor 4. The presence of the elements 44 permits the installation of the motor 1 on any kind of rigid support without needing to provide any further elastic supports and thus permits not only the reduction of installation time but also the uniform performance of the motor 1 itself.

Figure 3:
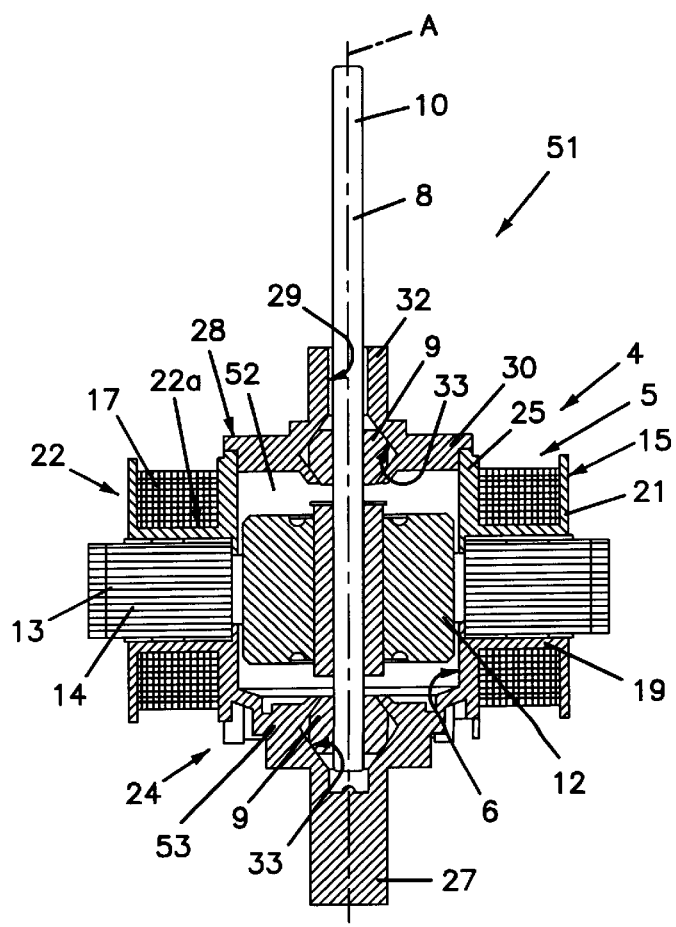
FIG. 3 illustrates, on a reduced scale and with some parts in section and some parts removed for reasons of clarity, a second preferred embodiment of the electric motor shown in FIG. 1.

The embodiment illustrated in FIG. 3 shows an motor 51 like the motor 1, except that the motor 51 differs from the motor 1 due to the fact that the assembly element 15 is not monolithic but instead comprises two assembly semi-elements 52 and 53, which are realised in molded plastic material, and these are assembled with the stator 5 before the realisation of the windings 17, and anyway before the rotor 4 is partially inserted into the opening 6. The semi-element 53 presents a relative support seat 33 engaged by a relative bushing 9, while the other seat 33 is still obtained in the cover 28.

Figure 4:
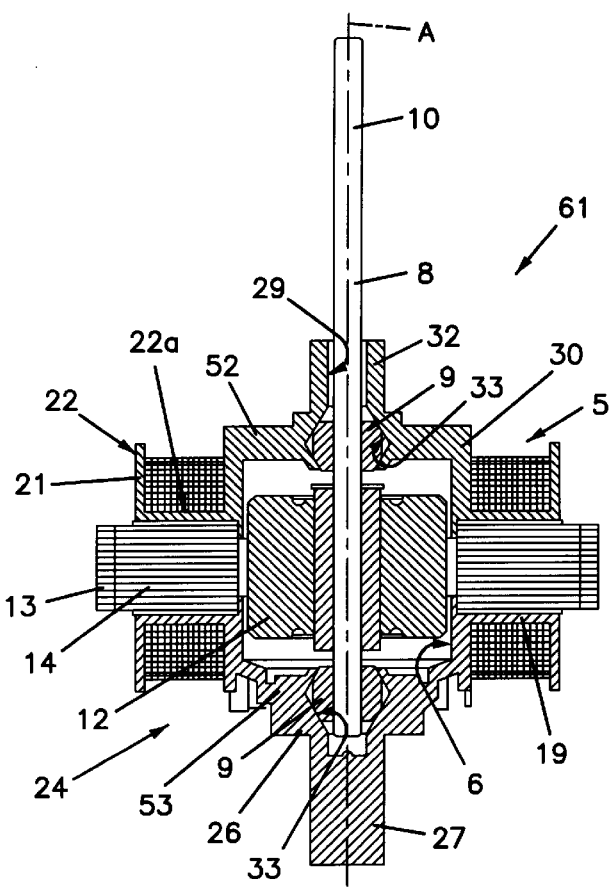
FIG. 4 illustrates, on a reduced scale and with some parts in section and some parts removed for reasons of clarity, a third preferred embodiment of the electric motor shown in FIG. 1.

The embodiment illustrated in FIG. 4 shows an motor 61 like the motor 51, except for the fact that the motor 61 differs from the motor 51 due to the fact that the cover 28 is realised by means of being molded together with the semi- element 52 so that the border 31 of the plate 30 is joined to the annular border 25 of the cylinder 18. In this case, the semi-elements 52 and 53 are assembled to each other after the rotor 4 has been partially inserted into the opening 6, and before the realisation of the windings 17. In this case, the seats 22 are obtained in each semi-element 52 and 53, and the relative bushings 9 are snap mounted in the seats 33 before the two semi-elements 52 and 53 are assembled to each other.

Figure 5:
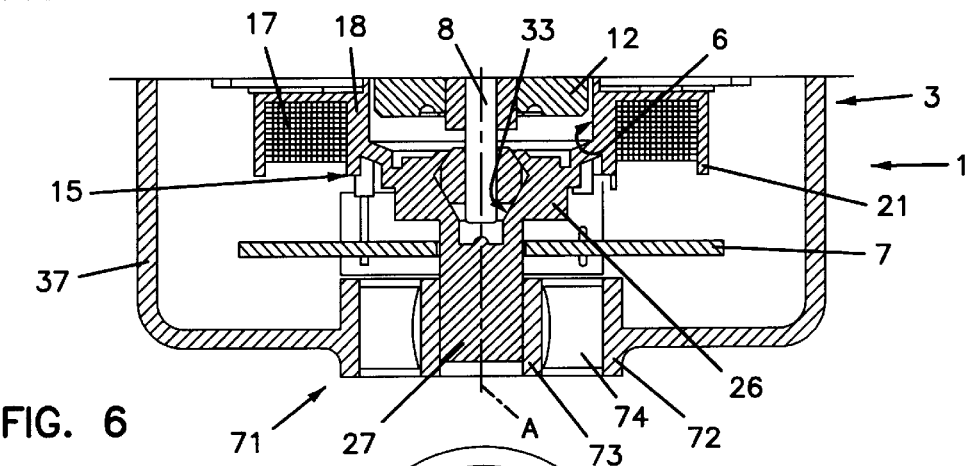
FIG. 5 illustrates a preferred form of embodiment of a detail of the motor shown in FIG. 1.
Figure 6:
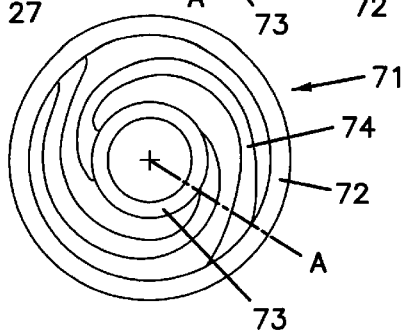
FIG. 6 illustrates a frontal elevation of a detail of FIG. 5.

FIGS. 5 and 6 illustrate a preferred embodiment of the elastic support elements 44, which is to say that they illustrate two elastic support elements 71 (of which only one is shown), which, instead of being defined by respective rings which can be mounted inside the borders 40 and 43, are realised integrally with the relative semi-shells 37 and 38, and comprise, in place of the borders 40 and 43 themselves, a respective external annular plate 72 and a respective internal annular plate 73 which are co-axial to each other and to the A axis. Each element 71 also comprises at least two springs 74 for connecting the relative plates 72 and 73 suitable for permitting both the movement of the motor shaft 8 in a transverse direction to the A axis and the rotation of the plate 73 in relation to the relative plate 72, and suitable for contrasting any movement of the shaft 8 itself in an axial direction parallel to the A axis. The springs 74 with which each element 71 is provided can also be provided for in a greater number than that shown in the illustration, for example in the case that it is necessary to increase the rigidity of the element 71 itself.

It is evident form the above description that the motor 1, in the preferred embodiment described, achieves the aims of minimising both assembly time, by using internal components in the place of further external components for coupling to the above-mentioned rigid support, and production casts by realising the assembly element 15 and the casing 3 in such a way as to save on the costs of components for assembly and mounting. It is also possible to have an electric motor 1 ready to be installed without the addition, as mentioned above, of any further external components, permitting uniform performance according to the parameters projected for the motor 1 itself.

What is claimed:

1. Electronic switching electric motor comprising a rotor, a stator defined by a number of stator teeth and by an assembly element of the stator teeth, and an external casing and two elastic supports interposed between the assembly element and the external casing;

wherein the assembly element comprises two support seats for the rotor, at least a first seat of the tow seats being located within the assembly element;

the assembly element presenting an internal opening for the rotor, the assembly element further comprising a cover for closing the internal opening; a second seat of the two seats being located within the cover;

wherein the assembly element is made form an insulating plastic and is co-molded together with the stator teeth.

2. Motor according to claim 1, wherein the assembly element comprises housing and fixing means for housing the cover and for fixing the cover to the assembly element.

3. Motor according to claim 1, wherein the assembly element comprises two semi-elements for assembly, molded and assembled to each other.

4. Motor according to claim 3, wherein one of the two semi-elements comprises housing means for housing the cover and for fixing the cover to the semi-element for assembly.

5. Motor according to claim 4, wherein each of the semi-elements for assembly comprise a relative support seat for the rotor.

6. Motor according to claim 5, wherein the cover is integral with one of the two semi-elements for assembly.

7. Motor according to claim 1, wherein the two elastic supports are integral with the external casing.

8. Motor according to claim 1, wherein the external casing comprises at least one flange for coupling the external casing to a rigid support.

9. Motor according to claim 1, wherein the rotor is angularly coupled to a fan fo a ventilation device for refrigerators.

10. Motor according to claim 1, wherein the two support seats comprise relative support bushings for the rotor which can be snap mounted inside the support seats.

11. Motor according to claim 1, the motor further comprising an electronic device for supplying and controlling the electric motor.

* * * * *